(12) United States Patent
Banno et al.

(10) Patent No.: US 9,558,886 B2
(45) Date of Patent: Jan. 31, 2017

(54) ELECTRONIC COMPONENT

(71) Applicant: Murata Manufacturing Co., Ltd., Nagaokakyo-shi, Kyoto-fu (JP)

(72) Inventors: Koichi Banno, Nagaokakyo (JP); Shoichiro Suzuki, Nagaokakyo (JP); Taisuke Kanzaki, Nagaokakyo (JP); Akihiro Shiota, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 134 days.

(21) Appl. No.: 14/033,958

(22) Filed: Sep. 23, 2013

(65) Prior Publication Data

US 2014/0022696 A1 Jan. 23, 2014

Related U.S. Application Data

(63) Continuation of application No. PCT/JP2012/054546, filed on Feb. 24, 2012.

(30) Foreign Application Priority Data

Mar. 28, 2011 (JP) ................. 2011-069772

(51) Int. Cl.
*H01G 4/06* (2006.01)
*H01G 4/30* (2006.01)
(Continued)

(52) U.S. Cl.
CPC .............. *H01G 4/002* (2013.01); *H01G 4/012* (2013.01); *H01G 4/015* (2013.01); *H01G 4/018* (2013.01); *H01G 4/30* (2013.01); *H01G 4/12* (2013.01)

(58) Field of Classification Search
CPC ......... H01G 4/30; H01G 4/1227; H01G 4/232
(Continued)

(56) References Cited

U.S. PATENT DOCUMENTS 4,894,746 A * 1/1990 Mori et al. ................. 361/275.4
5,600,533 A * 2/1997 Sano .................... H01G 4/1227
361/305

(Continued)

FOREIGN PATENT DOCUMENTS

CN  101079347 A  11/2007
JP  58-204519 A  11/1983
(Continued)

OTHER PUBLICATIONS

Official Communication issued in corresponding Japanese Patent Application No. 2013-507283, mailed on Oct. 14, 2014.
(Continued)

*Primary Examiner* — Eric Thomas
*Assistant Examiner* — Arun Ramaswamy
(74) *Attorney, Agent, or Firm* — Keating & Bennett, LLP

(57) ABSTRACT

A laminate body includes a plurality of ceramic layers and capacitor conductors embedded in the laminate body so as to be opposed to each other via one of the ceramic layers. The capacitor conductors are made of an Al-based material, and the capacitor conductors include narrow portions, respectively, which function as fuse elements. The narrow portions have an average width smaller than an average width of portions of the capacitor conductors other than the narrow portions. As a result, the electronic component has an improved capability to protect its function as a capacitor when a short circuit occurs between capacitor conductors.

21 Claims, 12 Drawing Sheets

(51) Int. Cl.
  *H01G 4/232* (2006.01)
  *H01G 4/12* (2006.01)
  *H01G 4/002* (2006.01)
  *H01G 4/012* (2006.01)
  *H01G 4/018* (2006.01)
  *H01G 4/015* (2006.01)

(58) Field of Classification Search
  USPC .............................. 361/301.4, 321.1, 321.2
  See application file for complete search history.

(56) References Cited

U.S. PATENT DOCUMENTS

| | | | |
|---|---|---|---|
| 6,577,486 B1* | 6/2003 | Nishimiya et al. | 361/104 |
| 2007/0274022 A1 | 11/2007 | Togashi | |
| 2008/0115876 A1* | 5/2008 | Komatsu et al. | 156/89.14 |
| 2009/0225492 A1* | 9/2009 | Lee et al. | 361/303 |

FOREIGN PATENT DOCUMENTS

| | | |
|---|---|---|
| JP | 64-69008 A | 3/1989 |
| JP | 2-152212 A | 6/1990 |
| JP | 11-354368 A | 12/1999 |
| JP | 2000-49037 A | 2/2000 |
| JP | 2000-49038 A | 2/2000 |
| JP | 2000-100654 A | 4/2000 |
| JP | 2000-223352 A | 8/2000 |
| JP | 2001-307942 A | 11/2001 |
| JP | 2002-531939 A | 9/2002 |
| JP | 2003-146746 A | 5/2003 |
| JP | 2005-72294 A | 3/2005 |
| JP | 2006-190774 A | 7/2006 |
| JP | 2007-317786 A | 12/2007 |
| JP | 2009-206430 A | 9/2009 |
| JP | 2010-245095 A | 10/2010 |

OTHER PUBLICATIONS

Official Communication issued in corresponding Japanese Patent Application No. 2013-507283, mailed on Jan. 7, 2014.
Official Communication issued in International Patent Application No. PCT/JP2012/054546, mailed on May 29, 2012.
Official Communication issued in corresponding Japanese Patent Application No. 2013-507283, mailed on Jun. 2, 2015.
Official Communication issued in corresponding Chinese Patent Application No. 201280016083.2, mailed on Sep. 2, 2015.

* cited by examiner

F I G. 1
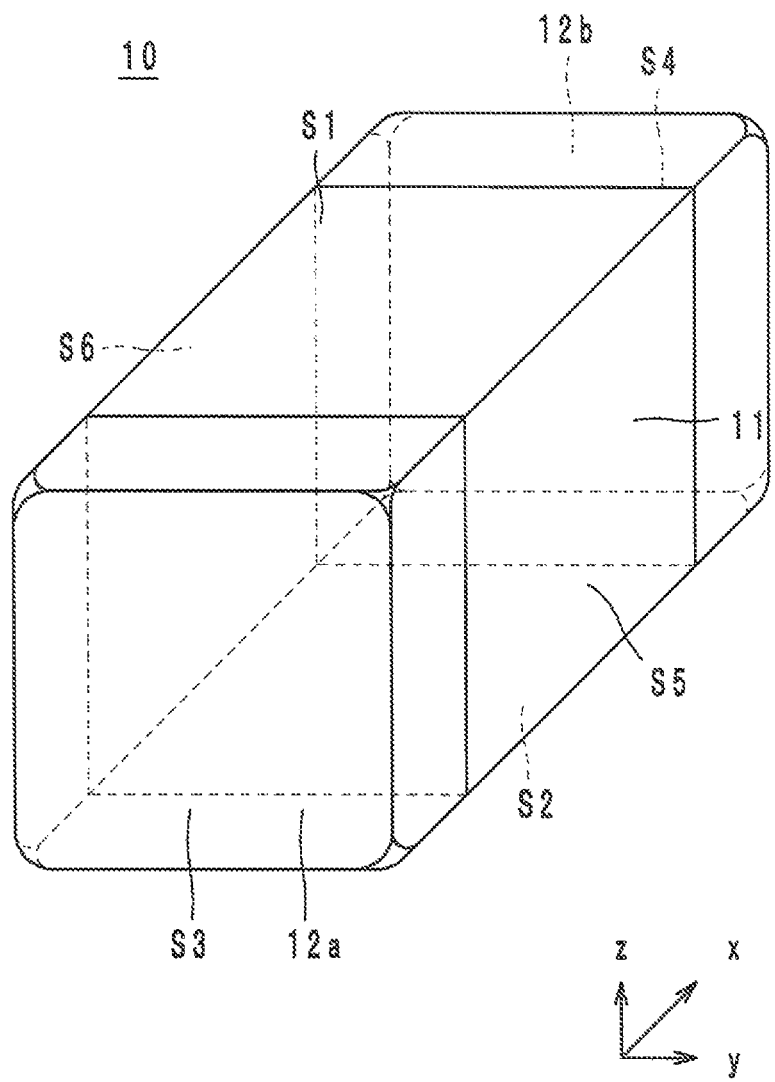

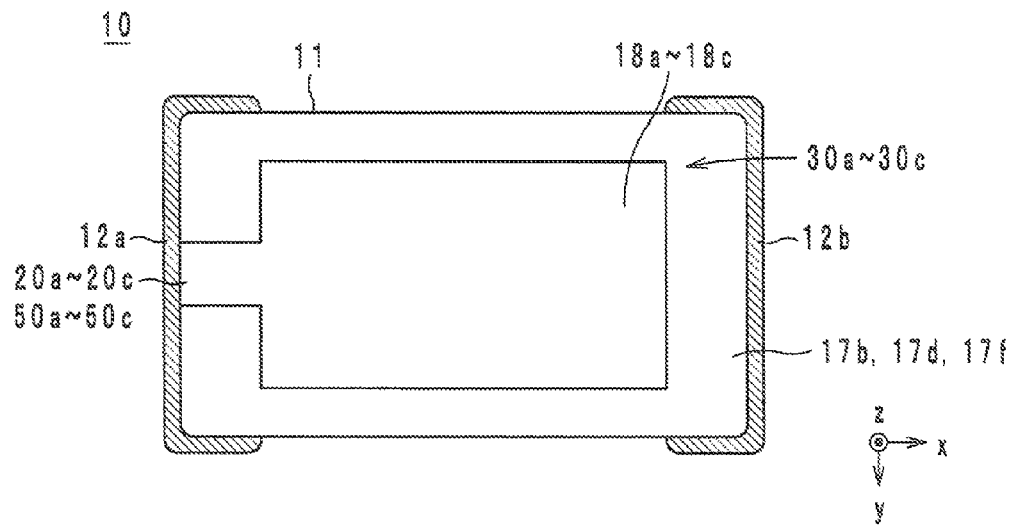
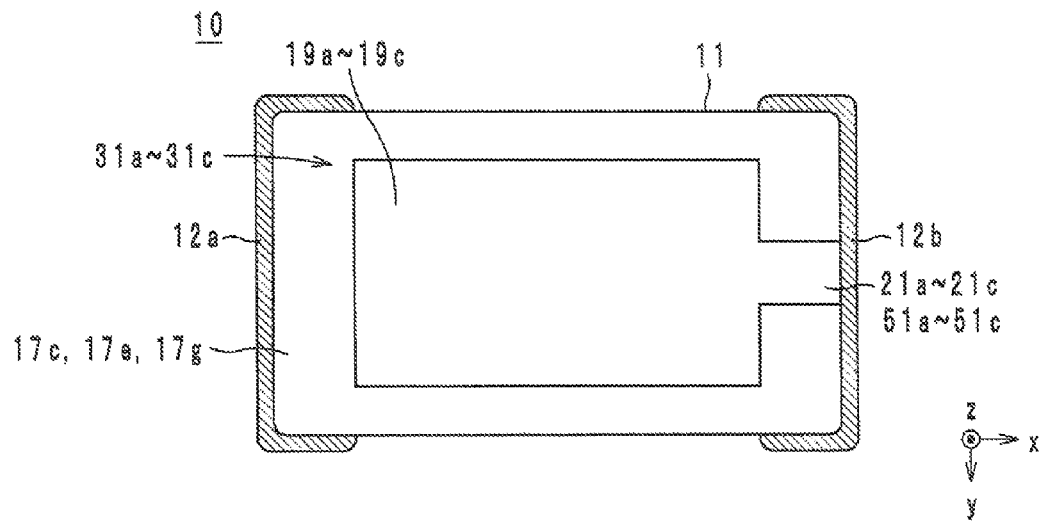

F I G . 5 A
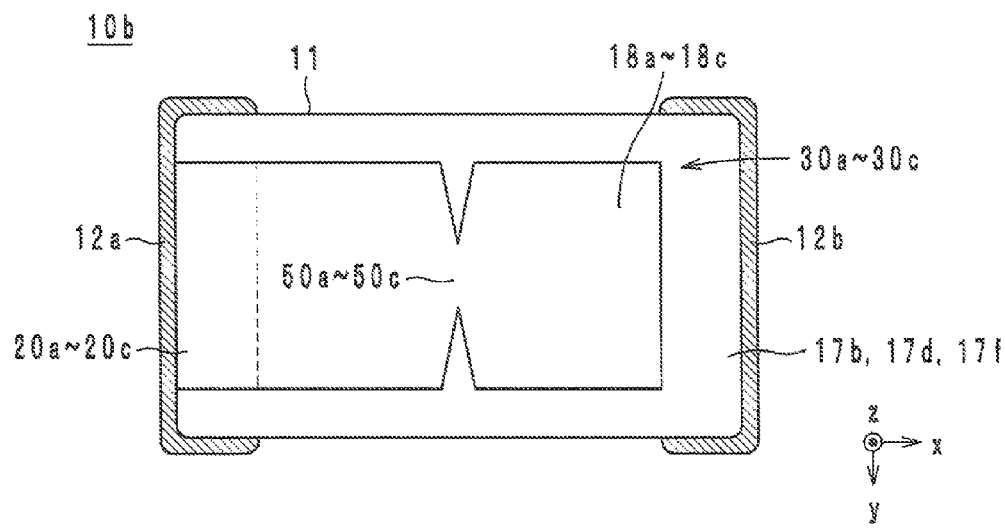
F I G . 5 B
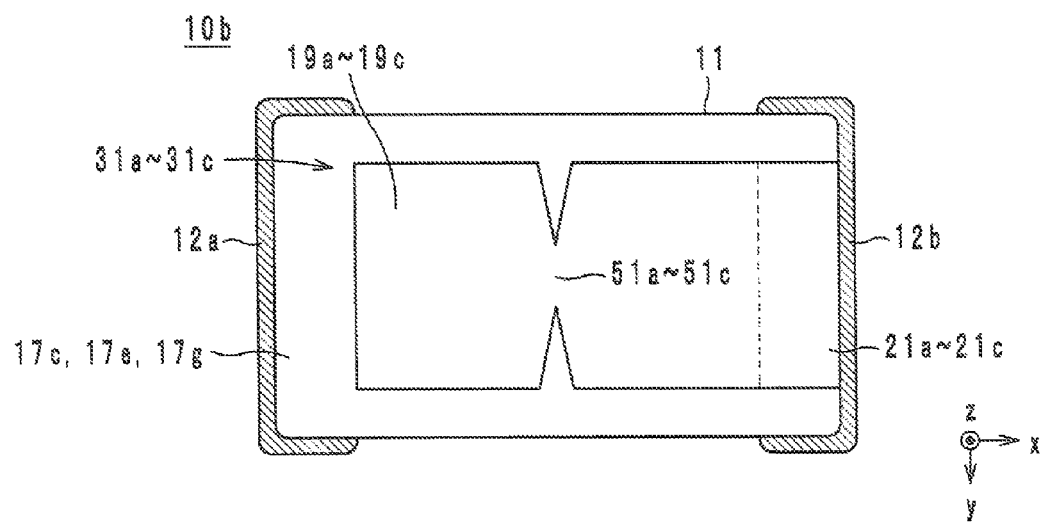

F I G . 13
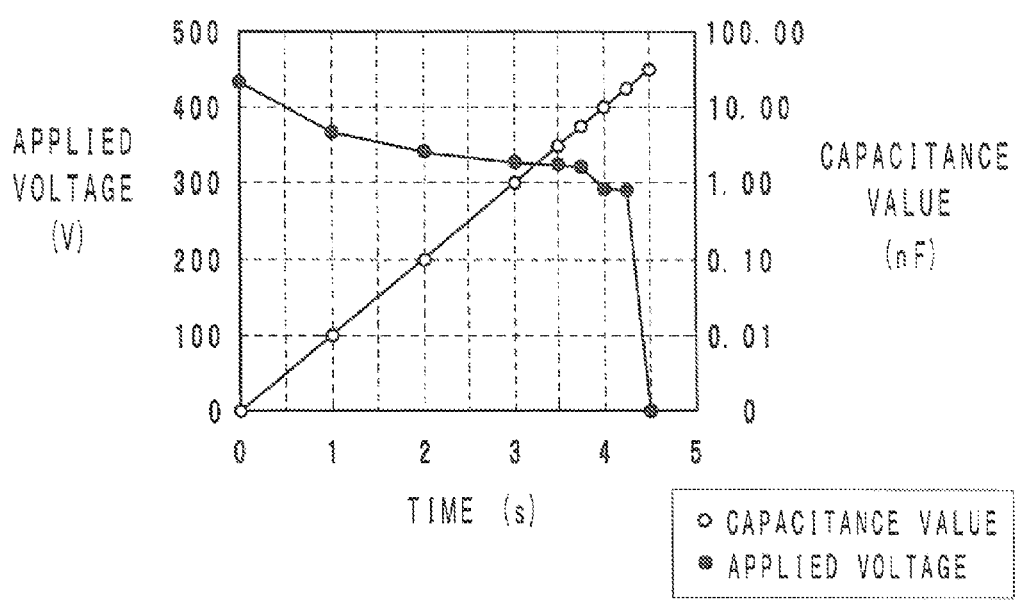

US 9,558,886 B2

ELECTRONIC COMPONENT

BACKGROUND OF THE INVENTION

1. Field of the Invention

The present invention relates to an electronic component and more particularly to an electronic component incorporating a capacitor.

2. Description of the Related Art

As an example of conventional electronic components, a multilayer ceramic capacitor as described in the Japanese Patent Laid-Open Publication No. 2000-100654 is known. In the multilayer ceramic capacitor as described in the Japanese Patent Laid-Open Publication No. 2000-100654, a multilayer ceramic body is formed by stacking dielectric ceramic layers and internal electrode layers made of a low-resistance material one upon another, and on the multilayer ceramic body, external electrodes are provided. A fuse element is provided in the internal electrode layers. Therefore, when a short circuit occurs in the internal electrode layers, overcurrent flows in the fuse element, and wiring disconnection occurs in the fuse element. This prevents the multilayer ceramic capacitor from losing its function as a capacitor.

The multilayer ceramic capacitor described in the Japanese Patent Laid-Open Publication No. 2000-100654, however, has a problem that its capability to protect its own function as a capacitor from being damaged by a short circuit that occurred between the internal electrode layers is not sufficient. More specifically, the internal electrode layers are made of a metal material, such as Ni, Cu, Ag, Cu coated with Ag, Ag—Pd-related metals, or the like. These metal materials have relatively high melting points. Accordingly, even when overcurrent flows in the fuse element, the fuse element does not melt readily and is less likely to have wiring disconnection. Also, these metal materials are also difficult to be oxidized. Therefore, even when wiring disconnection occurs in the fuse element, the disconnected points are not oxidized easily, and discharge may occur between the disconnected points, which may cause a short circuit.

SUMMARY OF THE INVENTION

Preferred embodiments of the present invention provide an electronic component that has an improved capability to protect its function as a capacitor from being damaged by a short circuit that occurred between capacitor conductors.

An electronic component according to a preferred embodiment of the present invention includes a laminate body defined by a plurality of ceramic layers stacked one upon another; and a first capacitor conductor and a second capacitor conductor that are embedded in the laminate body so as to be opposed to each other via one of the ceramic layers; wherein the first capacitor conductor is made of an Al-based material and includes a first narrow portion that functions as a fuse element; and the first narrow portion has an average width smaller than an average width of portions of the first capacitor conductor other than the narrow portion.

An electronic component according to preferred embodiments of the present invention provides an advantage of protecting its function as a capacitor more securely when a short circuit occurs between capacitor conductors.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a perspective view of an electronic component according to a first preferred embodiment of the present invention.

FIGS. 3A and 3B are internal plan views of the electronic component shown by FIG. 1.

FIGS. 5A and 5B are internal plan views of a second modified electronic component according to a preferred embodiment of the present invention.

FIG. 13 is a graph showing test results specific to samples of a third type according to a preferred embodiment of the present invention.

DETAILED DESCRIPTION OF THE PREFERRED EMBODIMENTS

Electronic components according to some preferred embodiments of the present invention will be described with reference to the accompanying drawings.

First Preferred Embodiment

Figure 2:
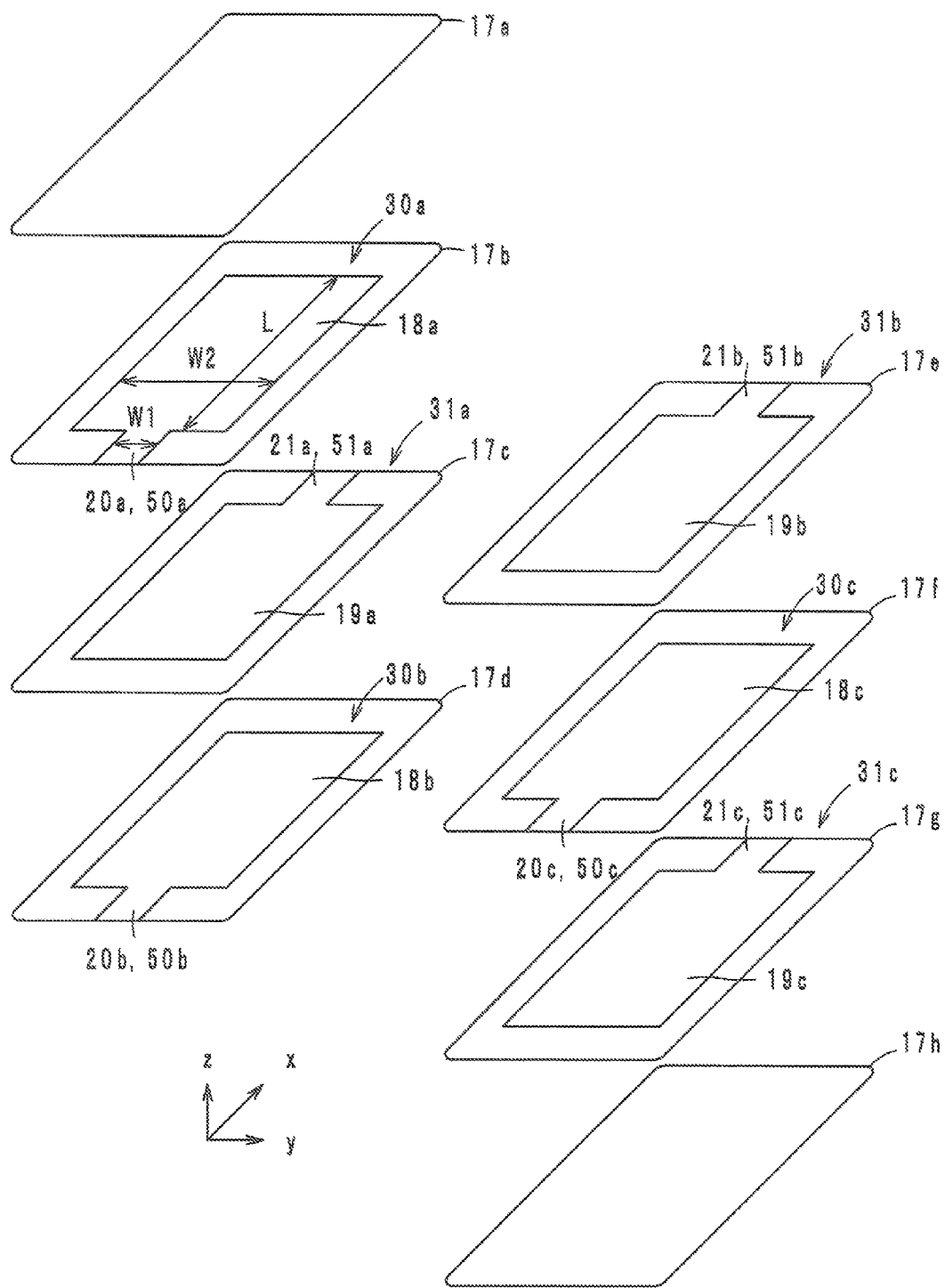
FIG. 2 is an exploded perspective view of a laminate body of the electronic component shown by FIG. 1.

First, the structure of an electronic component according to a first preferred embodiment is described with reference to the accompanying drawings. FIG. 1 is a perspective view of the electronic component 10 according to the first preferred embodiment. FIG. 2 is an exploded perspective view of a laminate body 11 of the electronic component shown by FIG. 1. FIGS. 3A and 3B are internal plan views of the electronic component shown by FIG. 1. In the following paragraphs, the lamination direction of the laminate body 11 is referred to as a z-axis direction. The direction in which the longer sides of the laminate body 11 extend when viewed from the z-axis direction is referred to as an x-axis direction. The direction in which the shorter sides of the laminate body 11 extend when viewed from the z-axis direction is referred to as a y-axis direction.

The electronic component 10 is a chip-type capacitor, and as shown by FIGS. 1 to 3B, the electronic component 10 preferably includes a laminate body 11, external electrodes 12a, 12b, and capacitor conductors 30a to 30c and 31a to 31c (not shown in FIG. 1).

The laminate body 11 is preferably a rectangular or substantially rectangular parallelepiped, for example. However, the corners and the edges of the laminate body 11 are preferably rounded off. In the following paragraphs, a surface of the laminate body 11 in a positive side in the z-axis direction is referred to as a top surface S1, and a surface of the laminate body 11 in a negative side in the z-axis direction is referred to as a bottom surface S2. Further, a surface of the laminate body 11 in a negative side in the x-axis direction is referred to as an end surface S3, and a surface of the laminate body 11 in a positive side in the x-axis direction is referred to as an end surface S4. A surface of the laminate body 11 in a positive side in the y-axis direction is referred to as a side surface S5, and a surface of the laminate body 11 in a negative side in the y-axis direction is referred to as a side surface S6. The bottom surface S2 is a mounting surface arranged to face a main surface of a circuit board when the electronic component 10 is mounted on the circuit board.

As shown by FIG. 2, the laminate body 11 is preferably defined by a plurality of ceramic layers 17a to 17h stacked one upon another in this order from the positive side to the negative side in the z-axis direction. The ceramic layers 17a to 17h, which are rectangular or substantially rectangular, are preferably made of dielectric ceramic that consists primarily of a perovskite compound containing Ba and Ti and that further contains a Bi-based constituent. Specifically, the material of the ceramic layers 17a to 17h is 17a to 17h prepared by adding Bi to a perovskite compound consisting primarily of Ba and Ti, and in this moment, the mixing ratio of Bi is not less than about 2 mol and not more than about 20 mol to about 100 mol of Ti contained in the perovskite compound. In the following paragraphs, a main surface of each of the ceramic layers 17a to 17h in the positive side in the z-axis direction is referred to as a front surface, and a main surface of each of the ceramic layers 17a to 17h in the negative side in the z-axis direction is referred to as a back surface.

The top surface S1 of the laminate body 11 is the front surface of the ceramic layer 17a arranged farthest in the positive side in the z-axis direction. The bottom surface S2 of the laminate body 11 is the back surface of the ceramic layer 17h arranged farthest in the negative side in the z-axis direction. The end surface S3 of the laminate body 11 are preferably defined by shorter sides of the ceramic layers 17a to 17h in the negative side in the x-axis direction. The end surface S4 of the laminate body 11 is preferably defined by shorter sides of the ceramic layers 17a to 17h in the positive side in the x-axis direction. The side surface S5 of the laminate body 11 is preferably defined by longer sides of the ceramic layers 17a to 17h in the positive side in the y-axis direction. The side surface S6 of the laminate body 11 is preferably defined by longer sides of the ceramic layers 17a to 17h in the negative side in the y-axis direction.

The capacitor conductors 30a to 30c and 31a to 31c are conductor layers preferably made of an Al-based material. The capacitor conductors 30a to 30c and 31a to 31c are arranged opposite to one another via the ceramic layers 17, and thereby, capacitors are defined. As shown by FIGS. 2 and 3, the capacitor conductors 30a to 30c are preferably provided respectively on the front surfaces of the ceramic layers 17b, 17d and 17f, and thus, are embedded in the laminate body 11. The capacitor electrodes 31a to 31c are preferably provided respectively on the front surfaces of the ceramic layers 17c, 17e and 17g, and thus, are embedded in the laminate body 11.

Each of the capacitor conductors 30a to 30c includes a capacitance conductor 18a to 18c and a lead conductor 20a to 20c. The capacitance conductors 18a to 18c are preferably rectangular or substantially rectangular and are provided on the front surfaces of the corresponding ceramic layers 17b, 17d, and 17f.

The lead conductors 20a to 20c are connected to the respective capacitance conductors 18a to 18c, and are drawn to the end surface S3 of the laminate body 11 so as to be exposed on the end surface S3. More specifically, the lead conductors 20a to 20c are preferably drawn from the shorter sides of the respective capacitance conductors 18a to 18c in the negative side in the x-axis direction farther to the negative side in the x-axis direction to reach the shorter sides of the corresponding ceramic layers 17b, 17d, and 17f in the negative side in the x-axis direction.

Each of the capacitor conductors 31a to 31c preferably includes a capacitance conductor 19a to 19c and a lead conductor 21a to 21c. The capacitance conductors 19a to 19c preferably are rectangular or substantially rectangular and are provided on the front surfaces of the corresponding ceramic layers 17c, 17e, and 17g. The capacitance conductors 19a to 19c overlap with the capacitance conductors 18a to 18c via the ceramic layers 17c, 17e, and 17g when viewed from the z-axis direction. Thus, capacitance is generated among the capacitance conductors 18a to 18c and 19a to 19c, that is, capacitors are defined.

The lead conductors 21a to 21c are connected to the respective capacitance conductors 19a to 19c, and are drawn to the end surface S4 of the laminate body 11 so as to be exposed on the end surface S4. More specifically, the lead conductors 21a to 21c are drawn from the shorter sides of the respective capacitance conductors 19a to 19c in the positive side in the x-axis direction farther to the positive side in the x-axis direction to reach the shorter sides of the corresponding ceramic layers 17c, 17e, and 17g in the positive side in the x-axis direction.

The external electrodes 12a and 12b are preferably formed by application of Ag paste. The external electrodes 12a and 12b are preferably arranged so as to spread over the end surfaces S3 and S4, respectively, and to extend to the top surface S1, the bottom surface S2 and the side surfaces S5 and S6. The external electrode 12a is preferably connected to the lead conductors 20a to 20c, and the external electrode 12b is connected to the lead conductors 21a to 21c. More specifically, the external electrode 12a covers the entire end surface S3 of the laminate body 11 to cover the ends of the lead conductors 20a to 20c exposed on the end surface S3. Further, the external electrode 12a extends from the end surface S3 around the edges to the top surface S1, the bottom surface S2 and the side surfaces S5 and S6. The external electrode 12b covers the entire end surface S4 of the laminate body 11 to cover the ends of the lead conductors 21a to 21c exposed on the end surface S4. Further, the external electrode 12b extends from the end surface S4 around the edges to the top surface S1, the bottom surface S2 and the side surfaces S5 and S6.

Further, the electronic component 10 preferably has a structure as described below to protect its function as a capacitor from being damaged by a short circuit that occurred between the capacitor conductors 30a to 30c and 31a to 31c.

As shown in FIGS. 2 and 3, each of the capacitor conductors 30a to 30c includes a narrow portion 50a to 50c, and each of the capacitor conductors 31a to 31c includes a narrow portion 51a to 51c. The width W1 of the narrow portions 50a to 50c and 51a to 51c is preferably smaller than the width W2 of the other portions of the capacitor conductors 30a to 30c and 31a to 31c. The widths W1 and W2 are the dimensions of the narrow portions 50a to 50c and 51a to 51c and the dimensions of the other portions of the capacitor conductors 30a to 30c and 31a to 31c in the direction (y-axis direction) perpendicular to the normal direction of the end surface S3 (x-axis direction).

In the electronic component having the narrow portions 50a to 50c and 51a to 51c, when a short circuit occurs between the capacitor conductors 30a to 30c and 31a to 31c, overcurrent flows in the narrow portions 50a to 50c and 51a to 51c, and the narrow portions 50a to 50c and 51a to 51c heat up and fuse. Consequently, wiring disconnection occurs in the narrow portions 50a to 50c and 51a to 51c. Thus, the narrow portions 50a to 50c and 51a to 51c function as fuse elements.

In the electronic component 10, the narrow portions 50a to 50c and 51a to 51c are preferably the lead portions 20 and 21, respectively. Thus, the narrow portions 50a to 50c and 51a to 51c are provided in the capacitor conductors 30a to 30c and 31a to 31c, elsewhere than the capacitance conductors 18a to 18c and 19a to 19c, respectively.

Next, a preferred embodiment of a manufacturing method of the electronic component 10 according to the present invention is described with reference to FIGS. 1 to 3B.

First, a polyvinyl butyral binder and an organic solvent such as, for example, ethanol or the like are preferably added to raw material powder of $BaTiO_3$, $Bi_2O_3$ and $BaCO_3$, and these materials are wet-blended in a ball mill. Thereby, ceramic slurry is obtained. The raw material powder contains $BaTiO_3$, $Bi_2O_3$ and $BaCO_3$ preferably at a ratio of about 100 mol:about 3 mol:about 2 mol. The ceramic slurry is sheeted and dried on a carrier sheet by, for example, the doctor blade method such that ceramic green sheets to be used as the ceramic layers 17a to 17h can be obtained. The ceramic green sheets preferably have a thickness of, for example, about 6 μm.

Next, conductive paste is coated on the ceramic green sheets to be used as the ceramic layers 17 by the screen printing method, and thus, the capacitor conductors 30a to 30c and 31a to 31c are formed. The conductive paste is prepared by adding an organic binder and an organic solvent to metal powder. The metal powder is preferably Al powder. The capacitor conductors 30a to 30c and 31a to 31c are provided such that the conductors 30 and 31 will preferably have a thickness of about 0.4 μm after firing.

Next, by placing the ceramic green sheets one upon another, an unfired mother laminate is formed. Thereafter, pressure bonding of the unfired mother laminate is carried preferably out by isostatic pressing, for example.

Next, the unfired mother laminate is cut into pieces of a specified size such that a plurality of unfired laminate bodies 11 are obtained. Thereafter, each of the laminate bodies is preferably polished, for example, by barrel polishing processing.

Next, the unfired laminate body 11 is heated to about 270 degrees Centigrade in the atmosphere so that the binder in the unfired laminate body 11 can be burned off. Further, the unfired laminate body 11 is preferably fired at about 650 degrees Centigrade for one hour. After the firing, the fired laminate body 11 was dissolved, and an ICP optical emission spectrochemical analysis of the fired laminate body 11 was conducted. The result showed that the composition ratio of Ti and Bi of the fired laminate body 11 was almost equal to that of the ceramic slurry prepared from the material powder.

Next, the external electrodes 12a and 12b are formed on the laminate body 11. Specifically, Ag paste containing $Bi_2O_3$—$SiO_2$—BaO fritted glass is preferably applied onto the surfaces of the laminate body 11 by a conventional dip method, a slit method or the like. Thereafter, the Ag paste is fired in the atmosphere at about 600 degrees centigrade such that the external electrodes 12 are formed. Through the processes above, the electronic component 10 is produced.

The electronic component 10 in accordance with a preferred embodiment of the present invention has an improved capability to protect its function as a capacitor from being damaged by a short circuit that occurred between the capacitor conductors 30a to 30c and 31a to 31c. More specifically, in the multilayer ceramic capacitor disclosed by the Japanese Patent Laid-Open Publication No. 2000-100654, the internal electrode layers are made of a metal material, such as Ni, Cu, Ag, Ag-coated Cu, Ag—Pd metal or the like. These metal materials have relatively high melting points. Therefore, even when overcurrent flows in the fuse element, the fuse element does not melt easily and is less likely to have wiring disconnection.

In the electronic component 10 according to a preferred embodiment of the present invention, on the other hand, the capacitor conductors 30a to 30c and 31a to 31c are made of an Al-based material. Al has a low melting point, compared with the metal materials such as Ni, Cu, Ag, Ag-coated Cu, Ag—Pd metal, etc. Therefore, when a short circuit occurs between the capacitor conductors 30a to 30c and 31a to 31c, overcurrent preferably flows in the narrow portions 50a to 50c and 51a to 51c, and the narrow portions 50a to 50c and 51a to 51c melt relatively easily and is more likely to have wiring disconnection. In the electronic component 10, consequently, the function as a capacitor can be protected more securely when a short circuit occurs between the capacitor conductors 30a to 30c and 31a to 31c.

Also, Al is oxidized easily, compared with the metal materials such as, for example, Ni, Cu, Ag, Ag-coated Cu, Ag—Pd metal, etc. Therefore, when wiring disconnection occurs in the narrow portions 50a to 50c and 51a to 51c, the disconnected points in the narrow portions 50a to 50c and 51a to 51c are oxidized quickly, whereby insulating films are produced. This prevents a short circuit from occurring in the disconnected points of the narrow portions 50a to 50c and 51a to 51c. Thus, in the electronic component 10, the function as a capacitor can be protected more securely when a short circuit occurs between the capacitor conductors 30a to 30c and 31a to 31c.

In the electronic component 10, the ceramic layers 17a to 17h are preferably made of a material having a constituent containing Bi. Such a constituent containing Bi, especially $Bi_2O_3$ has a characteristic of accelerating oxidization of Al. In the electronic component 10, therefore, the disconnected points of the narrow portions 50a to 50c and 51a to 51c are oxidized quickly. Thus, in the electronic component 10, the function as a capacitor can be protected more securely when a short circuit occurs between the capacitor conductors 30a to 30c and 31a to 31c.

Since the capacitor conductors 30a to 30c and 31a to 31c of the electronic component 10 are made of Al that is oxidized relatively easily, the surfaces of the capacitor conductors 30a to 30c and 31a to 31c are covered with oxide films. Therefore, when wiring disconnection occurs in the narrow portions 50a to 50c and 51a to 51c due to overcurrent flow, melted Al is prevented from dispersing. Consequently, the electronic component 10 can be prevented from being damaged by dispersion of Al.

In the electronic component 10, the narrow portions 50a to 50c and 51a to 51c are provided in the capacitor conductors 30a to 30c and 31a to 31c, elsewhere than the capacitance conductors 18a to 18c and 19a to 19c, respectively. Thus, the provision of the narrow portions 50a to 50c and 51a to 51c does not cause a decrease in area of the capacitance conductors 18a to 18c and 19a to 19c. Accordingly, the capacitance value of the electronic component 10 can be prevented from decreasing.

Since the ceramic layers 17a to 17h of the electronic component 10 are made of a material including a perovskite compound containing Ba and Ti, the ceramic layers 17a to 17h have a large dielectric constant. Accordingly, the electronic component 10 can achieve a large capacitance value.

In order to prove the advantages of the electronic component 10 of the structure of the preferred embodiments of the present invention above, the inventors conducted an experiment as described below.

The inventors fabricated thirty samples of a first type and thirty samples of a second type. The capacitor conductors 30a to 30c and 31a to 31c of the first type of samples were made of an Al-based material, and the capacitor conductors 30a to 30c and 31a to 31c of the second type of samples were made of an Ag-based material.

Both the first type of samples and the second type of samples were fabricated to meet the following conditions. The first type of samples and the second type of samples were fabricated in the preferred embodiment of the method as described above in connection with a manufacturing method of the electronic component 10.

Size of electronic component: 1.0 mm×2.0 mm×1.0 mm
Thickness of ceramic layers: 5 μm
The number of ceramic layers sandwiched by capacitor conductors: 10 layers
Size of the capacitor conductors: W1=0.1 mm, W2=0.9 mm, L=1.8 mm
Area of the capacitance conductors of the capacitor conductors: $1.62 \times 10^{-6}$ $m^2$ The inventors conducted a breakdown voltage test on the first type of samples and the second type of samples. In the breakdown voltage test, a voltage was applied to each of the first type and the second type of samples while the voltage was raised from 0V to 1000V at a rate of 100V/s. By the breakdown voltage test, the inventors determine the breakdown voltage (the voltages at which short circuits occurred) and the breakage rate with respect to each of the first type and the second type. Table 1 shows the test results.

TABLE 1

|  | First Type | Second Type |
| --- | --- | --- |
| Breakdown Voltage | Short Circuit Not Occurred | 600 V |
| Rate of Broken Chips | 0/30 | 10/30 |

During the breakdown voltage test, when the applied voltage was within 400V to 450V, in all the samples, a short circuit occurred between the capacitance conductors 18a to 18c and 19a to 19c, and the narrow portions 50a to 50c and 51a to 51c fused. Thereafter, the voltage was further raised. Then, when the applied voltage was 600V, ten samples out of the thirty samples of the second type had a short circuit in the narrow portions 50a to 50c and 51a to 51c and were broken. With respect to the first type of samples, on the other hand, neither a short circuit nor breakage occurred even when the applied voltage was raised to 1000V. This test shows that occurrence of a short circuit in the narrow portions 50a to 50c and 51a to 51c and breakage of the electronic component 10 can be prevented by making the capacitor conductors 30a to 30c and 31a to 31c of an Al-based material.

In the test above, the portion where a short circuit occurred and the portion where fusing occurred were identified by the following method. In the test, the inventors used thirty samples of the first type and thirty samples of the second type, and applied a voltage to each of the samples while raising the voltage from 0V to 450V. When the voltage was raised to 450V, the inventors checked out the samples to determine the occurrence of a short circuit and occurrence of fusing. As a result, the samples of the first type and the second type had a short circuit between the capacitance conductors 18a to 18c and 19a to 19c and fusing in the narrow portions 50a to 50c and 51a to 51c.

Figure 4A:
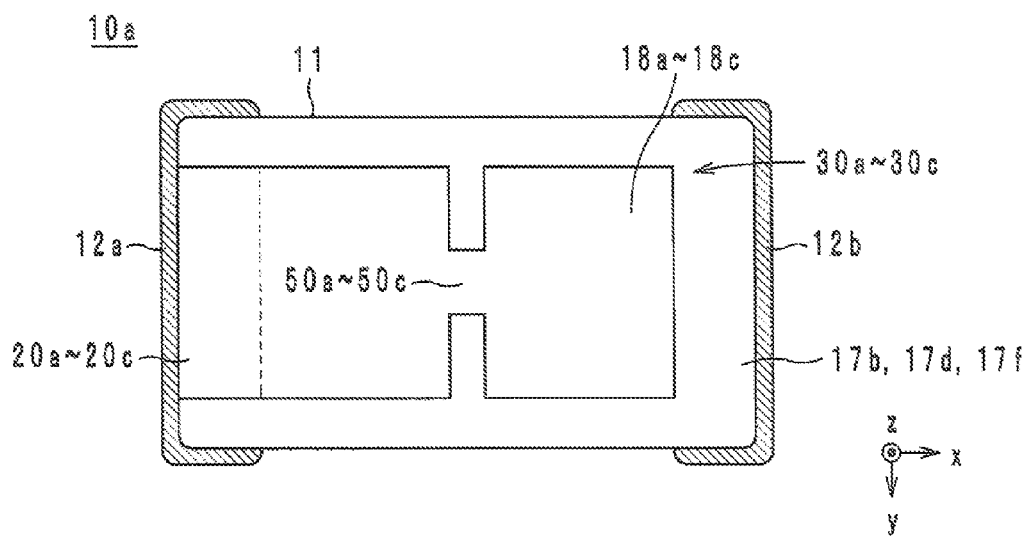
FIGS. 4A and 4B are internal plan views of a first modified electronic component according to a preferred embodiment of the present invention.
Figure 4B:
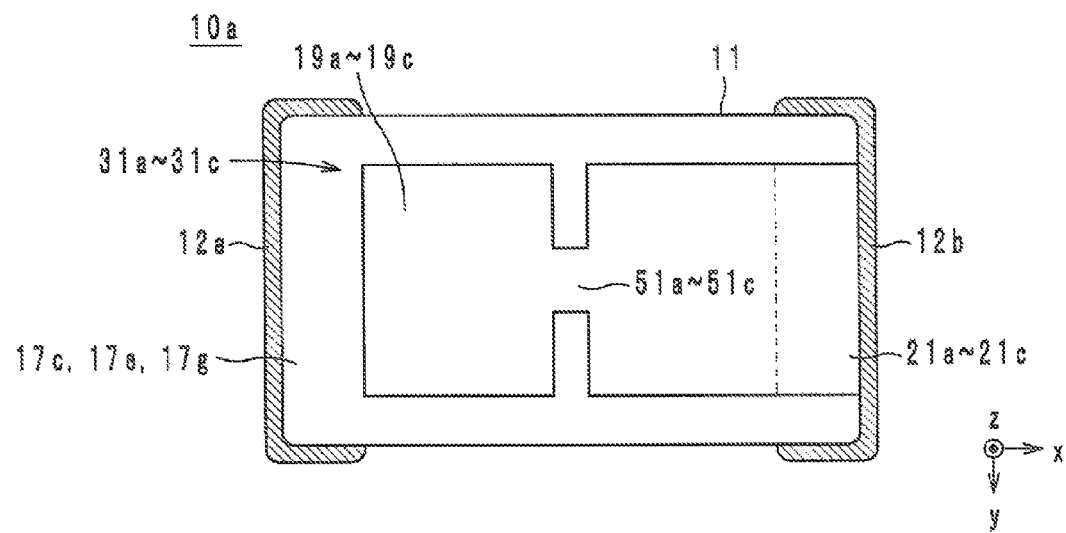

A first modified electronic component 10a of a preferred embodiment of the present invention is described below. FIGS. 4A and 4B are internal plan views of the first modified electronic component 10a.

As shown by FIGS. 4A and 4B, the narrow portions 50a to 50c and 51a to 51c may preferably be disposed in the middle of the respective capacitance conductors 18a to 18c and 19a to 19c. In this case, it is preferred that the narrow portions 50a to 50c and 51a to 51c overlap with one another and are located in the same position when viewed from the z-axis direction. In this arrangement, the provision of the narrow portions 50a to 50c and 51a to 51c does not cause a decrease of the area where the capacitance conductors 18a to 18c and 19a to 19c are opposed to each other. Accordingly, the electronic component 10a can be prevented from decreasing in capacitance value.

A second modified electronic component 10b according to a preferred embodiment of the present invention is described below. FIGS. 5A and 5B are internal plan views of the second modified electronic component 10b.

As shown by FIGS. 5a and 5b, the narrow portions 50a to 50c and 51a to 51c do not need to have a constant width. Specifically, the narrow portions 50a to 50c and 51a to 51c may be provided by wedges made in the rectangular or substantially rectangular capacitance conductors 18a to 18c and 19a to 19c.

In the electronic component 10b, the average width W1 of the narrow portions 50a to 50c and 51a to 51c is smaller than the width W2 of the other portions of the capacitor conductors 30a to 30c and 31a to 31c. Because the widths of the narrow portions 50a to 50c and 51a to 51c of the electronic component 10b are not constant, the average value is used. When the portions of the capacitor conductors 30a to 30c and 31a to 31c other than the narrow portions 50a to 50c and 51a to 51c do not have a constant width either, it is only necessary that the average width W1 of the narrow portions 50a to 50c and 51a to 51c is smaller than the average width W2 of the other portions of the capacitor conductors 30a to 30c and 31a to 31c.

Second Preferred Embodiment

Figure 6:
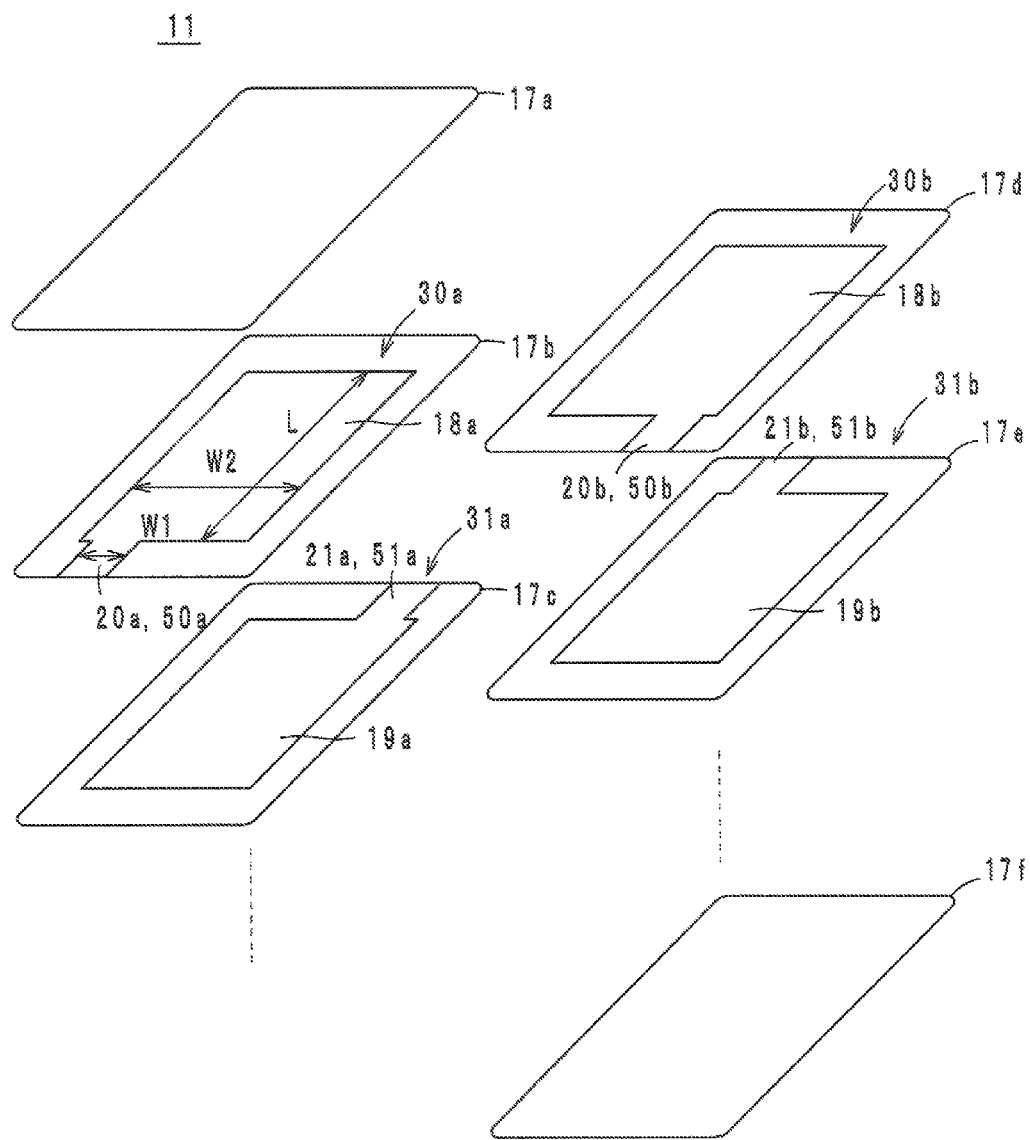
FIG. 6 is an exploded perspective view of a laminate body of an electronic component according to a second preferred embodiment of the present invention.

Next, the structure of an electronic component according to a second preferred embodiment of the present invention is described with reference to the accompanying drawings. FIG. 6 is an exploded perspective view of a laminate body 11 of the electronic component 10c according to the second preferred embodiment. FIGS. 7A to 8B are internal plan views of the electronic component 10c shown by FIG. 6. In the following paragraphs, the lamination direction of a laminate body 11 is referred to as a z-axis direction. The direction in which the longer sides of the laminate body 11 extend when viewed from the z-axis direction is referred to as an x-axis direction. The direction in which the shorter sides of the laminate body 11 extend when viewed from the z-axis direction is referred to as a y-axis direction. The perspective view in FIG. 1 of the electronic component 10 also corresponds to the general appearance of the electronic component 10c in a perspective view.

The electronic component 10c is a chip-type capacitor. As shown by FIGS. 1 and 6 to 8B, the electronic component 10c includes a laminate body 11, external electrodes 12a, 12b, and capacitor conductors 30a and 30b and 31a and 31b (not shown in FIG. 1).

The laminate body 11 is preferably a rectangular or substantially rectangular parallelepiped. However, the corners and the edges of the laminate body 11 are preferably rounded off. In the following paragraphs, a surface of the laminate body 11 in a positive side in the z-axis direction is referred to as a top surface S1, and a surface of the laminate body 11 in a negative side in the z-axis direction is referred to as a bottom surface S2. Further, a surface of the laminate body 11 in a negative side in the x-axis direction is referred to as an end surface S3, and a surface of the laminate body 11 in a positive side in the x-axis direction is referred to as an end surface S4. A surface of the laminate body 11 in a positive side in the y-axis direction is referred to as a side surface S5, and a surface of the laminate body 11 in a negative side in the y-axis direction is referred to as a side surface S6. The bottom surface S2 is amounting surface to face a main surface of a circuit board when the electronic component 10c is mounted on the circuit board.

As shown by FIG. 6, the laminate body 11 is defined by a plurality of ceramic layers 17a to 17f placed one upon another in this order from the positive side to the negative side in the z-axis direction. In FIG. 6, both of the ceramic layers 17b and 17c are shown as a single layer. Actually, however, a plurality of ceramic layers 17b and a plurality of ceramic layers 17c are stacked alternately in the z-axis direction. Likewise, although both of the ceramic layers 17d and 17e are shown as a single layer in FIG. 6, a plurality of ceramic layers 17d and a plurality of ceramic layers 17e are stacked alternately in the z-axis direction.

The ceramic layers 17a to 17f, which are rectangular, are preferably made of, for example, a dielectric ceramic that includes primarily a perovskite compound containing Ba and Ti and that further contains a Bi-based constituent. Specifically, the material of the ceramic layers 17a to 17f is prepared by adding Bi to a perovskite compound consisting primarily of Ba and Ti, and in this moment, the mixing ratio of Bi is preferably not less than about 2 mol and not more than about 20 mol to about 100 mol of Ti contained in the perovskite compound, for example. In the following paragraphs, a main surface of each of the ceramic layers 17a to 17f in the positive side in the z-axis direction is referred to as a front surface, and a main surface of each of the ceramic layers 17a to 17f in the negative side in the z-axis direction is referred to as a back surface.

The top surface S1 of the laminate body 11 is the front surface of the ceramic layer 17a arranged farthest in the positive side in the z-axis direction. The bottom surface S2 of the laminate body 11 is the back surface of the ceramic layer 17h arranged farthest in the negative side in the z-axis direction. The end surface S3 of the laminate body 11 is preferably defined by the shorter sides of the ceramic layers 17a to 17f in the negative side in the x-axis direction. The end surface S4 of the laminate body 11 is preferably defined by the shorter sides of the ceramic layers 17a to 17f in the positive side in the x-axis direction. The side surface S5 of the laminate body 11 is preferably defined by the longer sides of the ceramic layers 17a to 17f in the positive side in the y-axis direction. The side surface S6 of the laminate body 11 is preferably defined by the longer sides of the ceramic layers 17a to 17f in the negative side in the y-axis direction.

The capacitor conductors 30a, 30b, 31a, and 31b are preferably conductor layers made of an Al-based material. The capacitor conductors 30a, 30b, 31a, and 31b are arranged opposite to one another via the ceramic layers 17b to 17e, and thus capacitors are produced. As shown by FIGS. 6 to 8B, the capacitor conductors 30a and 30b are provided respectively on the front surfaces of the ceramic layers 17b and 17d, and thus, are embedded in the laminate body 11. The capacitor electrodes 31a and 31b are provided respectively on the front surfaces of the ceramic layers 17c and 17e, and thus, are embedded in the laminate body 11.

Since a plurality of ceramic layers 17b and a plurality of ceramic layers 17c are stacked alternately in the z-axis direction, the capacitor conductors 30a, which are provided on the front surfaces of the respective ceramic layers 17b, and the capacitor conductors 31a, which are provided on the front surfaces of the respective ceramic layers 17c, are arranged alternately in the z-axis direction. Likewise, since a plurality of ceramic layers 17d and a plurality of ceramic layers 17e are stacked alternately in the z-axis direction, the capacitor conductors 30b, which are provided on the front surfaces of the respective ceramic layers 17d, and the capacitor conductors 31b, which are provided on the front surfaces of the respective ceramic layers 17e, are arranged alternately in the z-axis direction.

Each of the capacitor conductors 30a and 30b includes a capacitance conductor 18a and 18b and a lead conductor 20a and 20b. The capacitance conductors 18a and 18b preferably are rectangular or substantially rectangular and are provided on the front surfaces of the corresponding ceramic layers 17b and 17d.

Figure 7A:
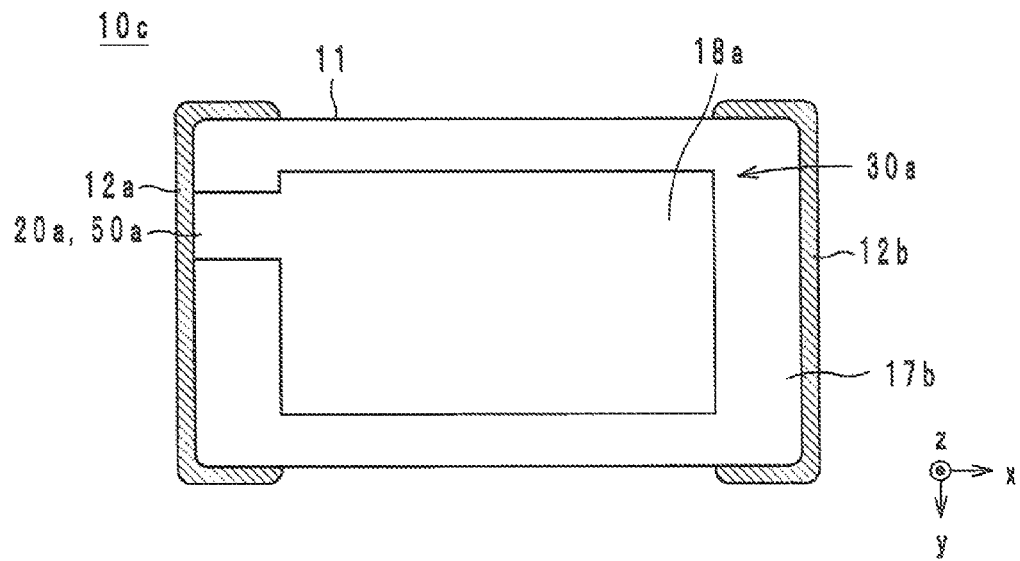
FIGS. 7A and 7B are internal plan views of the electronic component shown by FIG. 6.
Figure 8A:
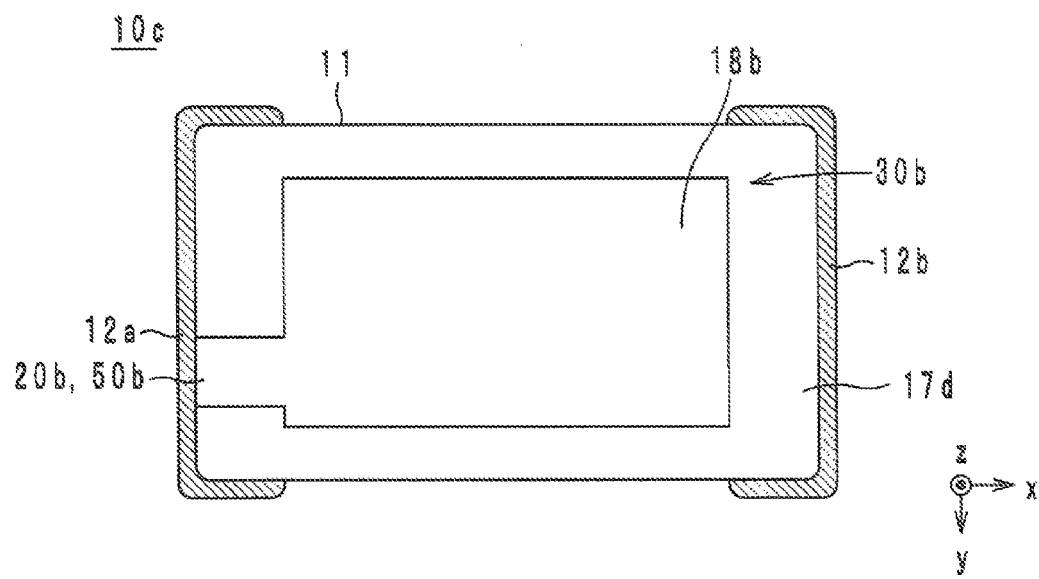
FIGS. 8A and 8B are internal plan views of the electronic component shown by FIG. 6.

The lead conductors 20a and 20b are connected to the respective capacitance conductors 18a and 18b, and are drawn to the end surface S3 of the laminate body 11 so as to be exposed on the end surface S3. Also, the lead conductors 20a and 20b are preferably disposed in two positions separately from each other when viewed from the z-axis direction. Specifically, as shown by FIGS. 6 and 7A, the lead conductor 20a is drawn from the shorter side of the capacitance conductor 18a in the negative side in the x-axis direction, the portion farther in the negative side than the center in the y-axis direction, farther to the negative side in the x-axis direction to reach the shorter side of the corresponding ceramic layer 17b or 17d in the negative side in the x-axis direction. As shown by FIGS. 6 and 8A, the lead conductor 20b is drawn from the shorter side of the capacitance conductor 18a in the negative side in the x-axis direction, the portion farther in the positive side than the center in the y-axis direction, farther to the negative side in the x-axis direction to reach the shorter side of the corresponding ceramic layer 17b or 17d in the negative side in the x-axis direction. Thus, the lead conductors 20a and 20b are preferably located in separate positions when viewed from the z-axis direction.

Each of the capacitor conductors 31a and 31b includes a capacitance conductor 19a and 19b and a lead conductor 21a and 21b. The capacitance conductors 19a and 19b preferably are rectangular or substantially rectangular and are provided on the front surfaces of the corresponding ceramic layers 17c and 17e. The capacitance conductors 19 overlap with the capacitance conductors 18a and 18b via the ceramic layers 17c and 17e when viewed from the z-axis direction. Thus, capacitance is generated among the capacitance conductors 18a and 18ba to 18c and 19a to 19c, that is, capacitors are defined.

Figure 7B:
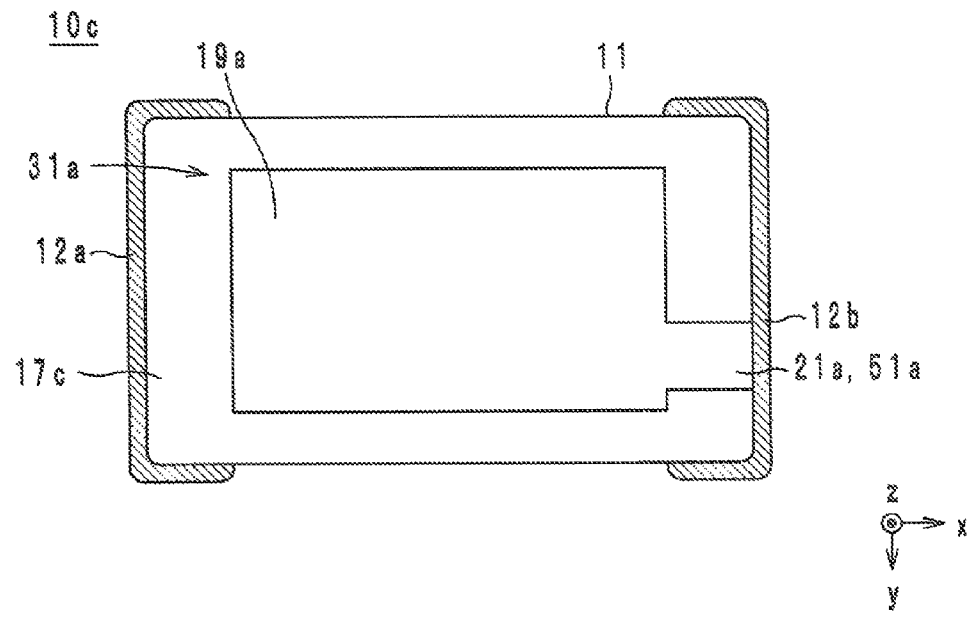
Figure 8B:
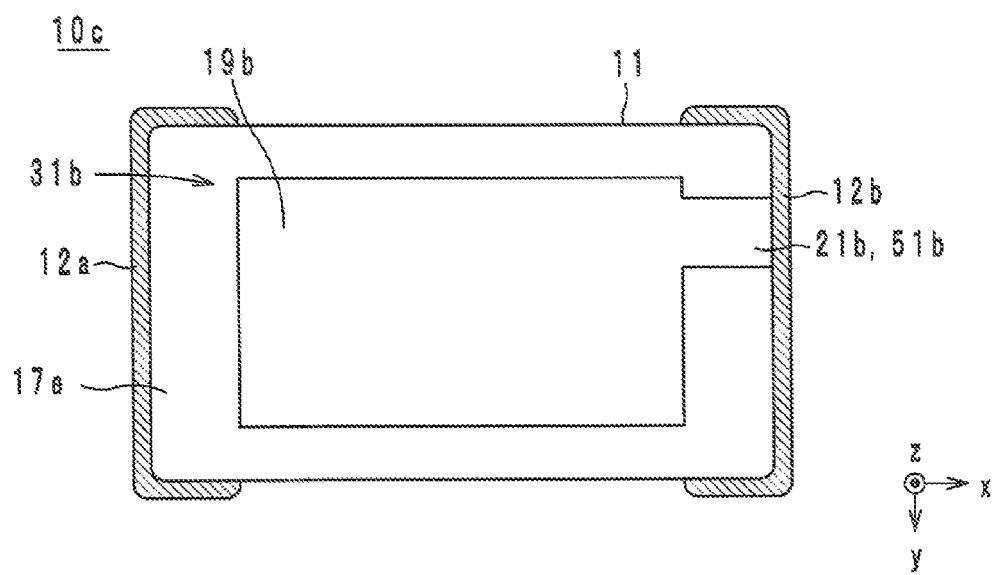

The lead conductors 21a and 21b are connected to the respective capacitance conductors 19a and 19b, and are drawn to the end surface S4 of the laminate body 11 so as to be exposed on the end surface S4. Also, the lead conductors 21a and 21b are preferably disposed in two positions separately from each other when viewed from the z-axis direction. Specifically, as shown by FIGS. 6 and 7B, the lead conductor 21a is drawn from the shorter side of the capacitance conductor 18a in the positive side in the x-axis direction, the portion farther in the positive side than the center in the y-axis direction, farther to the positive side in the x-axis direction to reach the shorter side of the corresponding ceramic layer 17c or 17e in the positive side in the x-axis direction. As shown by FIGS. 6 and 8B, the lead conductor 21b is drawn from the shorter side of the capacitance conductor 18a in the positive side in the x-axis direction, the portion farther in the negative side than the center in the y-axis direction, farther to the positive side in the x-axis direction to reach the shorter side of the corresponding ceramic layer 17c or 17e in the positive side in the x-axis direction. Thus, the lead conductors 21a and 21b are located in separate positions when viewed from the z-axis direction.

The external electrodes 12a and 12b are preferably formed by application of Ag paste. The external electrodes 12a and 12b are arranged so as to spread over the end surfaces S3 and S4, respectively, and to extend to the top surface S1, the bottom surface S2 and the side surfaces S5 and S6. The external electrode 12a is connected to the lead conductors 20a and 20b, and the external electrode 12b is connected to the lead conductors 21a and 21b. More specifically, the external electrode 12a covers the entire end surface S3 of the laminate body 11 to cover the ends of the lead conductors 20a and 20b exposed on the end surface S3. Further, the external electrode 12a extends from the end surface S3 around the edges to the top surface S1, the bottom surface S2 and the side surfaces S5 and S6. The external electrode 12b preferably covers the entire end surface S4 of the laminate body 11 to cover the ends of the lead conductors 21a and 21b exposed on the end surface S4. Further, the external electrode 12b extends from the end surface S4 around the edges to the top surface S1, the bottom surface S2 and the side surfaces S5 and S6.

Further, the electronic component 10c preferably has a structure as described below to protect its own function as a capacitor from being damaged by a short circuit that occurred between the capacitor conductors 30a to 30c and 31a to 31c.

As shown by FIGS. 6 to 8B, each of the capacitor conductors 30a to 30c preferably includes a narrow portion 50, and each of the capacitor conductors 31a to 31c includes a narrow portion 51. The width W1 of the narrow portions 50a to 50c and 51a to 51c is smaller than the width W2 of the other portions of the capacitor conductors 30a to 30c and 31a to 31c. The widths W1 and W2 are the dimensions of the narrow portions 50a to 50c and 51a to 51c and the dimensions of the other portions of the capacitor conductors 30a to 30c and 31a to 31c in the direction (y-axis direction) perpendicular to the normal direction of the end surface S3 (x-axis direction).

In the electronic component including the narrow portions 50a to 50c and 51a to 51c, when a short circuit occurs between the capacitor conductors 30a to 30c and 31a to 31c, overcurrent flows in the narrow portions 50a to 50c and 51a to 51c, and the narrow portions 50a to 50c and 51a to 51c heat up and fuse. Consequently, wiring disconnection occurs in the narrow portions 50a to 50c and 51a to 51c. Thus, the narrow portions 50a to 50c and 51a to 51c function as fuse elements.

In the electronic component 10c, the narrow portions 50a to 50c and 51a to 51c are the lead portions 20a and 20b and 21a and 21b, respectively. Therefore, the narrow portions 50a and 50b are located two separate positions when viewed from the z-axis direction, and do not overlap with each other when viewed from the z-axis direction. Likewise, the narrow portions 51a and 51b are located in two separate positions when viewed from the z-axis direction, and do not overlap with each other when viewed from the z-axis direction.

Next, a non-limiting example of a preferred embodiment of a manufacturing method of the electronic component 10c is described with reference to FIG. 1 and FIGS. 6A to 8B.

First, a polyvinyl butyral binder and an organic solvent such as, for example, ethanol or the like are preferably added to raw material powder of $BaTiO_3$, $Bi_2O_3$ and $BaCO_3$, and these materials are wet-blended in a ball mill. As a result, ceramic slurry is obtained. The raw material powder preferably contains $BaTiO_3$, $Bi_2O_3$ and $BaCO_3$ at a ratio of about 100 mol:about 3 mol:about 2 mol. The ceramic slurry is sheeted and dried on a carrier sheet by, for example, the doctor blade method such that ceramic green sheets to be used as the ceramic layers 17 can be obtained. The ceramic green sheets have a thickness of, for example, about 6 μm.

Next, Al is evaporated on the ceramic green sheets to be used as the ceramic layers 17a to 17f, and thus, the capacitor conductors 30a to 30c and 31a to 31c are formed. The capacitor conductors 30a to 30c and 31a to 31c are formed such that the conductors 30 and 31 will preferably have a thickness of about 0.4 μm after firing.

Next, by placing the ceramic green sheets one upon another, an unfired mother laminate is formed. Thereafter, pressure bonding of the unfired mother laminate is preferably carried out by, for example, isostatic pressing.

Next, the unfired mother laminate is cut into pieces of a specified size, whereby a plurality of unfired laminate bodies 11 are obtained. Thereafter, each of the laminate bodies is preferably polished, for example, by barrel polishing processing.

Next, the unfired laminate body 11 is preferably heated to about 270 degrees Centigrade in the atmosphere so that the binder in the unfired laminate body 11 can be burned off. Further, the unfired laminate body 11 is fired at about 650 degrees Centigrade for one hour. After the firing, the fired laminate body 11 was dissolved, and an ICP optical emission spectrochemical analysis of the fired laminate body 11 was conducted. The result showed that the composition ratio of Ti and Bi of the fired laminate body 11 was almost equal to that of the ceramic slurry prepared from the material powder.

Next, the external electrodes 12 are preferably formed on the laminate body 11. Specifically, Ag paste containing $Bi_2O_3$—$SiO_2$—BaO fritted glass is applied onto the surfaces of the laminate body 11 by, for example, a conventional dip method, a conventional slit method or the like. Thereafter, the Ag paste is fired in the atmosphere at about 600 degrees Centigrade, whereby the external electrodes 12 are formed. Through the processes above, the electronic component 10c is produced.

The electronic component 10c of the structure above, as is the case with the electronic component 10, has an improved capability to protect its function as a capacitor from being damaged by a short circuit that occurred between the capacitor conductors 30a to 30c and 31a to 31c. In the electronic component 10c, as is the case with the electronic component 10, the disconnected points of the narrow portions 50a to 50c and 51a to 51c are oxidized quickly, and therefore, in the electronic component 10c, the function as a capacitor can be protected more securely when a short circuit occurs between the capacitor conductors 30a to 30c and 31a to 31c. Also, as is the case with the electronic component 10, the electronic component 10c can be prevented from being damaged by dispersion of Al. As is the case with the electronic component 10, the capacitance value of the electronic component 10c can be prevented from decreasing. As is the case with the electronic component 10, the electronic component 10c can achieve a large capacitance value.

Further, in the electronic component 10c, it can preferably be prevented that fusing in the narrow portions 50a to 50c and 51a to 51c causes a sudden decrease of the capacitance value to zero. This will be described below in connection with the narrow portions 50a to 50c. In the electronic component 10, all the narrow portions 50a to 50c overlap with one another and are located in the same position when viewed from the z-direction. When any of the narrow portions 50a to 50c fuses, the laminate body 11 may crack in the z-direction, and the other narrow portions 50a to 50c may be damaged. In this case, all the narrow portions 50a to 50c will be damaged, and the capacitance value will be decreased to zero suddenly.

In the electronic component 10c, on the other hand, the narrow portions 50a and 50b are located in two separate positions when viewed from the z-direction. Thus, the distance between the narrow portions 50a and the narrow portions 50b in the electronic component 10c are larger than the distance among the narrow portions 50a to 50c in the electronic component 10. Therefore, when any of the narrow portions 50a fuses, it is not likely that a crack pierces through the narrow portions 50b, and the narrow portions 50b can be prevented from being damaged. Thus, in the electronic component 10c, it can be prevented that all the narrow portions 50a and 50b are damaged, and consequently, the capacitance value is prevented from suddenly decreasing to zero.

Figure 9A:
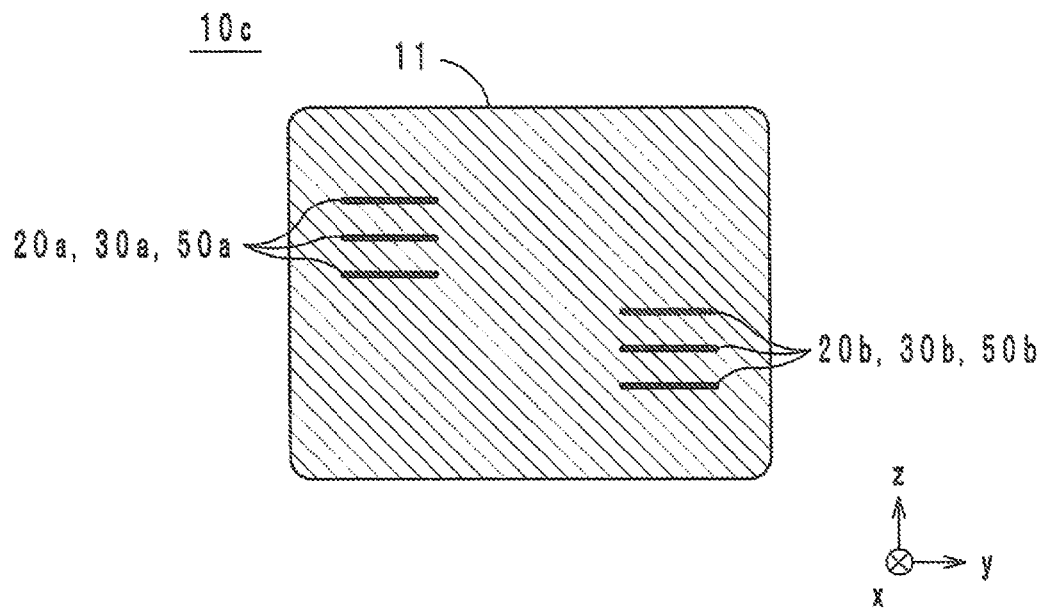
FIGS. 9A and 9B are sectional views of the electronic component according to the second preferred embodiment of the present invention.
Figure 9B:
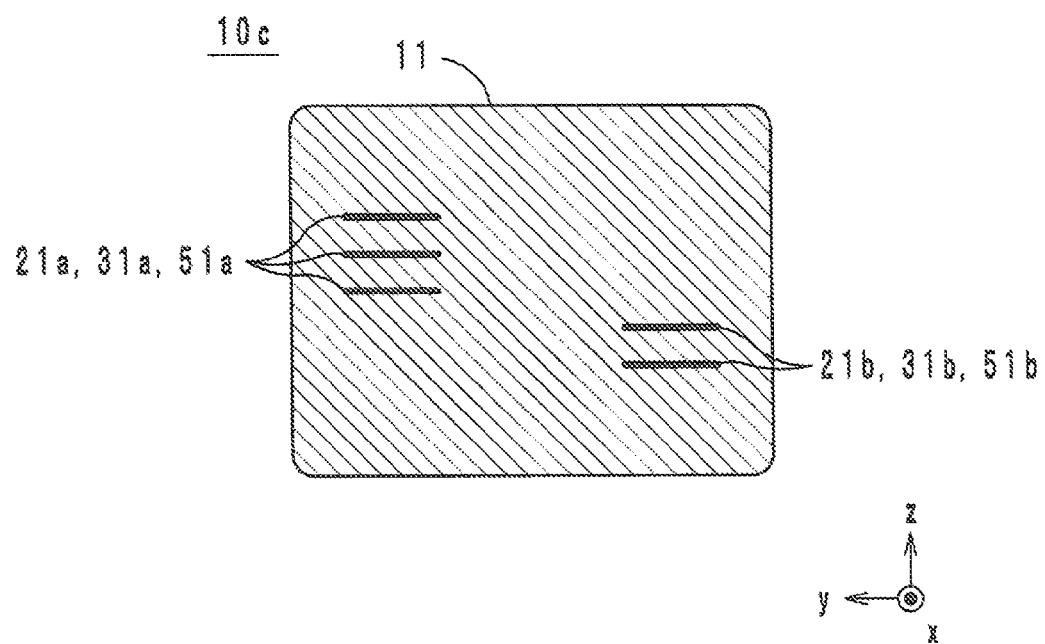
Figure 10A:
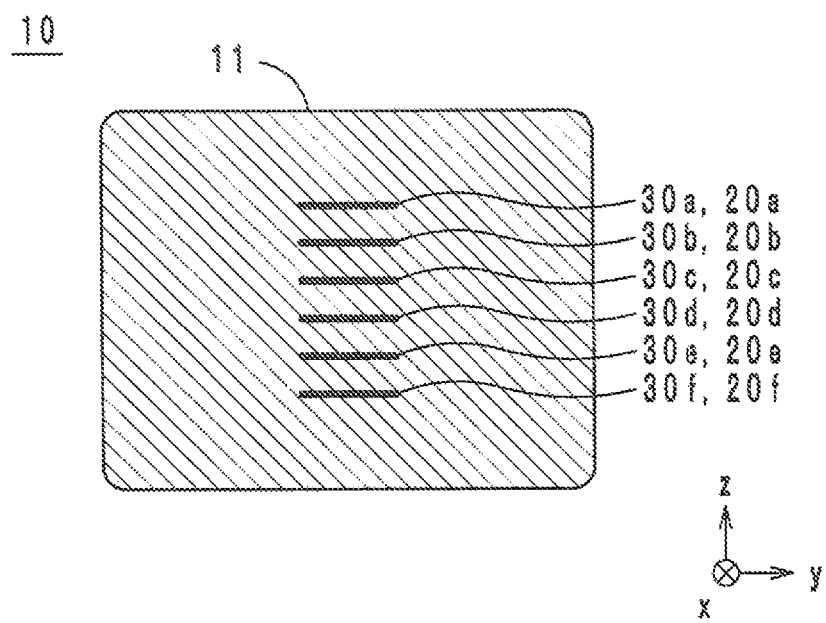
FIGS. 10A and 10B are sectional views of the electronic component according to the first preferred embodiment of the present invention.
Figure 10B:
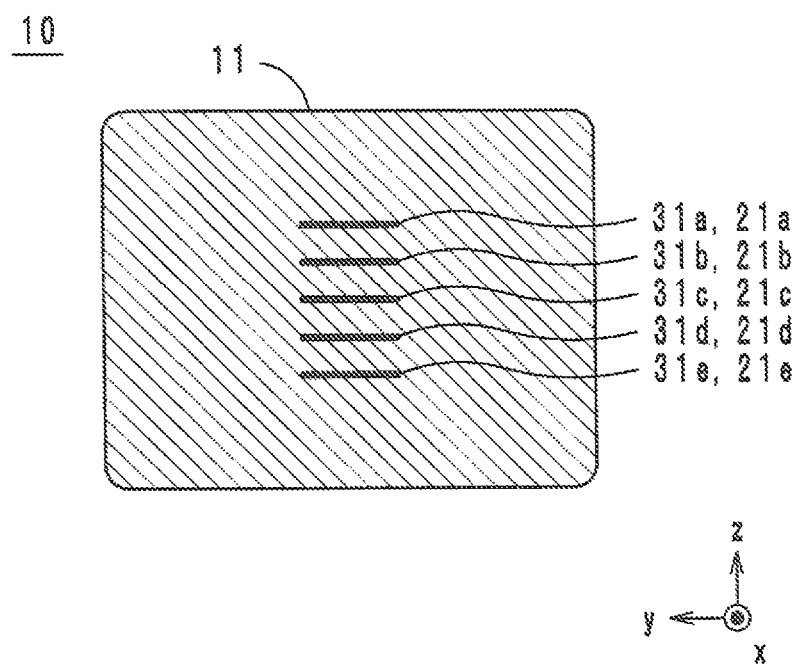

In order to prove the advantages of the electronic component 10c of the structure above, the inventors conducted an experiment as described below. FIGS. 9A and 9B are sectional views of the electronic component 10c according to the second preferred embodiment. FIGS. 10A and 10B are sectional views of the electronic component 10 according to the first preferred embodiment.

The inventors fabricated thirty samples of a third type and thirty samples of a fourth type. The third type is the electronic component 10c as shown by FIGS. 9A and 9B. The fourth type is the electronic component 10 as shown by FIGS. 10A and 10B.

Both the third type of samples and the fourth type of samples were fabricated to meet the following conditions. The third type of samples and the fourth type of samples were fabricated in the method as described above in connection with a manufacturing method of the electronic component 10c.

Size of electronic component: 1.0 mm×2.0 mm×1.0 mm
Thickness of ceramic layers: 5 μm
The number of ceramic layers sandwiched by capacitor conductors: 10 layers
Size of the capacitor conductors: W1=0.1 mm, W2=0.9 mm, L=1.8 mm
Area of the capacitance conductors of the capacitor conductors: $1.62 \times 10^{-6}$ m$^2$ Since each of the samples was fabricated to have 10 ceramic layers sandwiched by capacitor conductors, each of the samples had a total of eleven layers of capacitor conductors 30a to 30c and 31a to 31c. More specifically, as shown by FIG. 9A, each sample of the third type had three layers of capacitor conductors 30a and three layers of capacitor conductors 30b. As shown by FIG. 9B, each sample of the third type further had three layers of capacitor conductors 31a and two layers of capacitor conductors 31b. As shown by FIG. 10A, each sample of the fourth type had six layers of capacitor conductors 30a to 30f. As shown by FIG. 10B, each sample of the fourth type further had five layers of capacitor conductors 31a to 31e.

Figure 11:
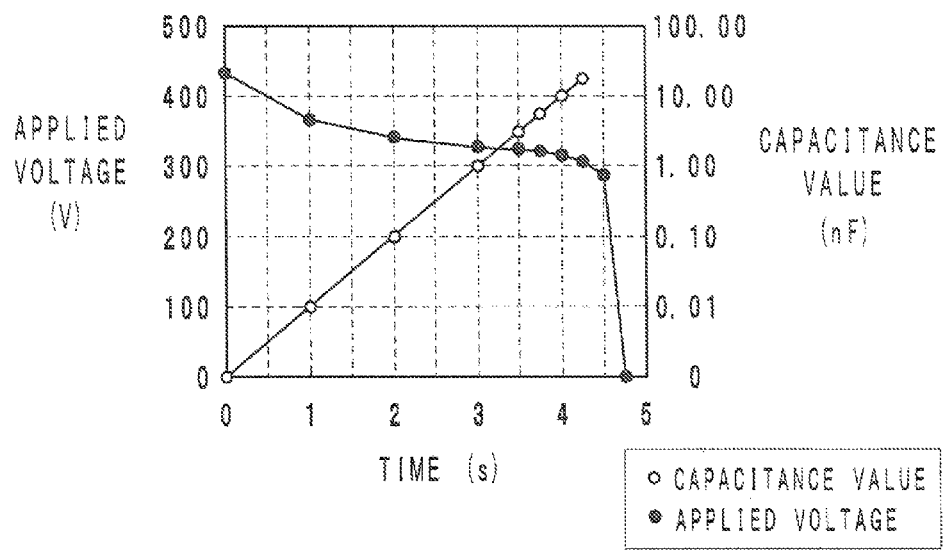
FIG. 11 is a graph showing results of a test conducted on samples of a fourth type according to a preferred embodiment of the present invention.
Figure 12:
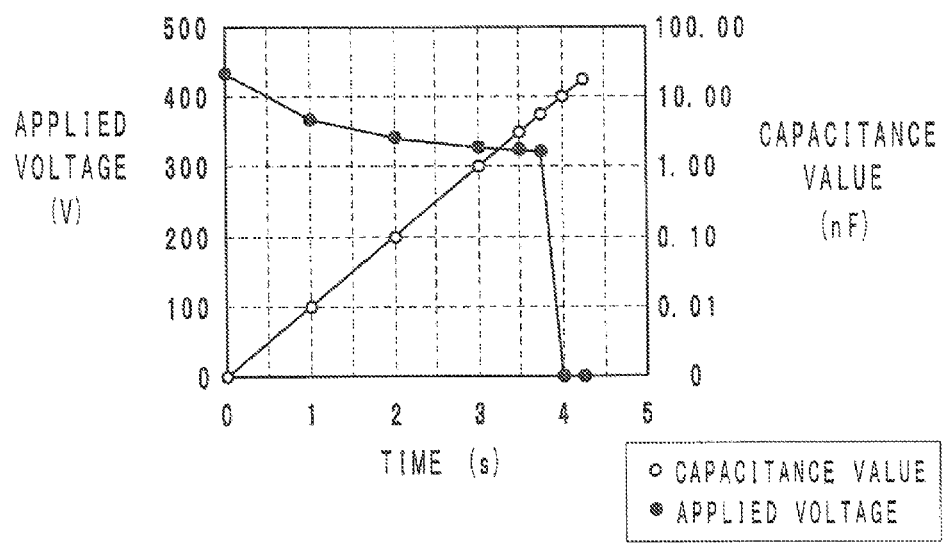
FIG. 12 is a graph showing test results specific to the samples of the fourth type.

The inventors conducted a breakdown voltage test on the third type of samples and the fourth type of samples. In the breakdown voltage test, while raising the voltage applied to each of the third type and the fourth type of samples from 0V to 1000V at a rate of 100V/s, the inventors examined the relation between the applied voltage and the capacitance value. FIG. 11 is a graph showing results of the test conducted on the fourth type of samples. FIG. 12 is a graph showing the test results specific to the fourth type of samples. FIG. 13 is a graph showing the test results specific to the third type of samples. In each of the graphs, the y-axis shows applied voltage and capacitance value, and the x-axis shows time.

Out of the thirty samples of the fourth type, five samples each had fusing in one narrow portion 50a to 50c and in one narrow portion 51a to 51c as the applied voltage was increasing. Meanwhile, as shown by FIG. 11, the capacitance value was decreasing gradually. It is favorable that the capacitance value decreases not suddenly to zero but gradually as in this case. Also with respect to the third type of samples, the capacitance value decreased gradually.

Out of the thirty samples of the fourth type, 25 samples, however, had disconnections in all the narrow portions 50a to 50c or in all the narrow portions 51a to 51c and had a sudden decrease of the capacitance value to zero as the voltage applied thereto was increasing. This is, as described above, attributed to the fact that all the narrow portions 50a to 50c were located in the same position when viewed from the z-direction and that all the narrow portions 51a to 51c were located in the same position when viewed from the z-direction, and it is considered that a crack triggered a chain of breakages of all the narrow portions 50a to 50c or all the narrow portions 51a to 51c.

With respect to the third type of samples, as shown by FIG. 13, the capacitance value decreased gradually as the voltage applied thereto was increasing. More specifically, the capacitance value decreased while the voltage was between 375V and 400V, and the capacitance value decreased while the voltage was between 425V and 450V. It is considered that for example, disconnection that occurred in all the narrow portions 50a did not affect the narrow portions 50b, and that the narrow portions 50b were damaged afterwards.

The test results show that by disposing the narrow portions 50a and 50b in separate positions and by disposing the narrow portions 51a and 51b in separate positions as in the third type of samples, a sudden decrease of the capacitance value to zero can be prevented.

Electronic components according to the present invention are not limited to the electronic components 10 and 10a-10c according to the preferred embodiments described above, and various changes and modifications are possible within the scope of the present invention.

In the electronic components 10a and 10b, the narrow portions 50a to 50c overlap with one another and are located in the same position when viewed from the z-axis direction, and the narrow portions 51a to 51c overlap with one another and are located in the same position when viewed from the z-axis direction. However, it is not always necessary that the narrow portions 50a to 50c overlap with one another and are located in the same position when viewed from the z-axis direction, and it is not always necessary that the narrow portions 51 overlap with one another and are located in the same position when viewed from the z-axis direction.

In each of the electronic components 10 and 10a-10c, two kinds of capacitor conductors 30a to 30c and 31a to 31c are used. However, three or more kinds of capacitor conductors may be used.

As has been described above, preferred embodiments of the present invention are applicable to electronic components. An electronic component according to preferred embodiments of the present invention provide an advantage of protecting its function as a capacitor more securely when a short circuit occurs between capacitor conductors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
   a laminate body including a plurality of ceramic layers; and
   a first capacitor conductor and a second capacitor conductor that are embedded in the laminate body so as to be opposed to each other via one of the ceramic layers;
   wherein the first capacitor conductor is made of a conductive Al-based material and includes a first narrow portion that functions as a fuse element;
   the first narrow portion has an average width smaller than an average width of portions of the first capacitor conductor other than the narrow portion;
   ceramic layers of the plurality of ceramic layers that are adjacent to the first capacitor conductor are made of a dielectric material including a Bi-based constituents the dielectric material from which the ceramic layers adjacent to the first capacitor conductor are made further includes a perovskite compound containing Ba and Ti; and
   the dielectric material from which the ceramic layers adjacent to the first capacitor conductor are made has a composition containing Ti and Ba at a ratio of about 100 mol to more than 100 mol.

2. An electronic component according to claim 1, wherein a plurality of first capacitor conductors are provided; and
   the first narrow portions of the respective first capacitor conductors are located in two or more separate positions when viewed from a lamination direction of the laminate body.

3. An electronic component according to claim 2, wherein at least two of the narrow portions of the respective first capacitor conductors are located in separate positions when viewed from the lamination direction.

4. An electronic component according to claim 1, wherein the dielectric material has a composition containing Bi and Ti at a ratio of not less than about 2 mol and not more than about 20 mol to about 100 mol.

5. An electronic component according to claim 1, wherein
   the laminate body is a rectangular or substantially rectangular parallelepiped;
   the electronic component further comprises:
   a first external electrode that is connected to the first capacitor conductor and that covers a first end surface of the laminate body; and
   a second external electrode that is connected to the second capacitor conductor and that covers a second end surface of the laminate body; and
   a width of the first narrow portion and a width of the portions of the first capacitor conductor other than the first narrow portion are dimensions in a direction perpendicular or substantially perpendicular to a normal direction of the first end surface.

6. An electronic component according to claim 1, wherein the first narrow portion is located at a position other than an area where the first capacitor electrode and the second capacitor electrode overlap with each other when viewed from the lamination direction.

7. An electronic component according to claim 1, wherein
   the second capacitor conductor includes a second narrow portion that defines a fuse element; and
   the second narrow portion has an average width smaller than an average width of portions of the first capacitor conductor other than the narrow portion.

8. An electronic component according to claim 7, wherein the first narrow portion and the second narrow portion overlap with each other when viewed from the lamination direction.

9. An electronic component according to claim 7, wherein the first narrow portion and the second narrow portion do not overlap with each other when viewed from the lamination direction.

10. An electronic component according to claim 8, wherein the first narrow portion and the second narrow portion are provided by wedges defined in the first capacitor electrode and the second capacitor electrode.

11. An electronic component according to claim 7, wherein the first narrow portion and the second narrow portion have a constant width.

12. An electronic component according to claim 7, wherein the first narrow portion and the second narrow portion are respectively arranged at middle portions of the first capacitor electrode and the second capacitor electrode in an extending direction of the first capacitor electrode and the second capacitor electrode.

13. An electronic component comprising:
    a laminate body including a plurality of ceramic layers; and
    a first capacitor conductor and a second capacitor conductor that are embedded in the laminate body so as to be opposed to each other via one of the ceramic layers;
    wherein the first capacitor conductor is made of a conductive Al-based material and includes a first narrow portion that functions as a fuse element;
    the second capacitor conductor is made of an Al-based material and includes a second narrow portion that functions as a fuse element;

the first fuse element and the second fuse element do not overlap one another in a lamination direction of the laminate body;

ceramic layers of the plurality of ceramic layers that are adjacent to the first capacitor conductor and the second capacitor conductor are made of a dielectric material including a Bi-based constituent;

the dielectric material from which the ceramic layers adjacent to the first capacitor conductor and the second capacitor conductor are made further includes a perovskite compound containing Ba and Ti; and the dielectric material from which the ceramic layers adjacent to the first capacitor conductor are made has a composition containing Ti and Ba at a ratio of about 100 mol to more than 100 mol.

14. An electronic component according to claim 13, wherein the first narrow portion and the second narrow portion have a constant width.

15. An electronic component according to claim 13, wherein the electronic component further comprises:
- a first external electrode that is connected to the first capacitor conductor and that covers a first end surface of the laminate body; and
- a second external electrode that is connected to the second capacitor conductor and that covers a second end surface of the laminate body.

16. An electronic component according to claim 13, wherein the first narrow portion and the second narrow portion are provided by wedges defined in the first capacitor electrode and the second capacitor electrode.

17. An electronic component according to claim 13, wherein the first narrow portion and the second narrow portion have a constant width.

18. An electronic component according to claim 13, wherein the first narrow portion and the second narrow portion are respectively arranged at middle portions of the first capacitor electrode and the second capacitor electrode in an extending direction of the first capacitor electrode and the second capacitor electrode.

19. An electronic component according to claim 13, wherein
the dielectric material has a composition containing Bi and Ti at a ratio of not less than about 2 mol and not more than about 20 mol to about 100 mol.

20. The electronic component according to claim 1, wherein each of the plurality of the ceramic layers is made of the dielectric material including the Bi-based constituent.

21. The electronic component according to claim 13, wherein each of the plurality of the ceramic layers is made of the dielectric material including the Bi-based constituent.

* * * * *